United States Patent
Meehan et al.

(10) Patent No.: US 6,169,442 B1
(45) Date of Patent: Jan. 2, 2001

(54) IC MONITORING CHIP AND A METHOD FOR MONITORING TEMPERATURE OF A COMPONENT IN A COMPUTER

(75) Inventors: Patrick Meehan, Pallaskenry; John Blake, Raheen, both of (IE); David Thomson, Fremont, CA (US)

(73) Assignee: Analog Devices, Inc., Norwood, MA (US)

( * ) Notice: Under 35 U.S.C. 154(b), the term of this patent shall be extended for 0 days.

(21) Appl. No.: 09/291,409

(22) Filed: Apr. 13, 1999

(51) Int. Cl.[7] ....................................... H03K 3/42
(52) U.S. Cl. ........................ 327/513; 327/307; 327/512; 374/172
(58) Field of Search ................... 327/307, 512, 327/513; 374/172; 324/207.12

(56) References Cited

U.S. PATENT DOCUMENTS

| | | | |
|---|---|---|---|
| 5,639,163 | * | 6/1997 | Davidson et al. .................... 327/512 |
| 5,710,519 | * | 1/1998 | McCalpin et al. .................... 327/513 |
| 6,055,489 | * | 4/2000 | Beatty et al. ........................ 327/512 |

* cited by examiner

*Primary Examiner*—Kenneth B. Wells
(74) *Attorney, Agent, or Firm*—Wolf, Greenfield & Sacks, P.C.

(57) ABSTRACT

An IC monitoring chip (10) for remotely monitoring the output of a thermal diode (5) formed in the substrate of a CPU (2) for monitoring the temperature of a thermal plate (3) of the CPU (2) comprises a signal conditioning circuit (12) which relays the output from the diode (5) to an analog-to-digital converter (14), which in turns outputs a two's compliment signal to an adder (22). The adder (22) adds the two's compliment signal to a temperature offset value stored in a temperature offset register (17), which compensates for the temperature difference between the diode (5) and the thermal plate (3). Comparators (24) and (25) compare the output from the adder (22) with upper and lower predetermined temperature limits in upper and lower limit registers (19) and (20) for determining the temperature of the thermal plate (3). The temperature offset value is stored in ROM (35) of the computer (1) and is written to the register (17) each time the computer (1) is powered up. The IC chip (10) operates independently of the CPU (2).

33 Claims, 2 Drawing Sheets

IC MONITORING CHIP AND A METHOD FOR MONITORING TEMPERATURE OF A COMPONENT IN A COMPUTER

FIELD OF THE INVENTION

The present invention relates to an integrated circuit monitoring chip for monitoring the output of a temperature sensing element which measures the temperature of a component in a computer, and the invention also relates to a computer comprising the IC monitoring chip, and to a method for monitoring the temperature of a component in a computer.

BACKGROUND TO THE INVENTION

The operating temperature of a computer is relatively critical. It is important that the ambient temperature within a computer, and in particular, the operating temperature of some of the integrated circuit chips should remain within predetermined upper and lower temperature limits. In particular, it is important that the temperature of the integrated circuit chips and other components should not exceed upper predetermined temperature limits. Temperature sensors for monitoring the temperature within a computer, and also for monitoring the temperature of integrated circuit chips are know. Typically, such sensors comprise a temperature sensing element such as a thermal diode or a substrate transistor which typically are formed in the chip. The output of such sensing elements is relayed to analysing means, which typically is implemented in software in the central processing unit, which compares the monitored temperature with the respective upper and lower temperatures limits. On the monitored temperature falling outside the upper or lower limits, corrective action is taken, for example, by switching on a cooling fan, slowing down the operating speed of the computer or other suitable corrective action.

However, there are two problems with such temperature sensors. Firstly, in general, it is not possible to measure the temperature at the precise location of the component, the temperature of which is to be monitored, and thus a temperature difference generally exists between the component and the site at which the temperature is measured. In general, a temperature sensing element such as a thermal diode or a substrate transistor is formed in the substrate of the chip for sensing the temperature. However, generally, the temperature sensing element must be located some distance from the site of the component the temperature of which is to be monitored. For example, in a central processing unit (CPU) chip the location at which the temperature may be critical is at the heat sink thermal plate. However, since the temperature sensing element is provided by a substrate thermal diode or transistor which is located in the substrate, the temperature being sensed by the temperature sensing element is not the true temperature of the thermal plate, and the actual temperature of the thermal plate could be higher or lower than the temperature being sensed by the sensing element.

Secondly, the monitoring of temperature requires processing time in order to read and analyse the temperature sensed by the temperature sensing element and to compare the analysed temperature with upper and lower predetermined limits. This processing time is required at regular predetermined intervals at which the temperature is to be checked. This is a particular problem in the case of CPU chips, since the monitoring and analysis of the temperature and comparing the temperature with upper and lower predetermined limits is carried out by the CPU under the control of a software sub-routine. For example, in the case of the INTEL XEON (Trade Mark) processor a temperature sensing element is formed in the substrate of the processor for monitoring the temperature of the thermal plate of the processor. Accordingly, a running programme in the INTEL XEON (Trade Mark) processor must be interrupted at regular predetermined intervals to allow the sub-routine to monitor, analyse and compare the temperature sensed by the temperature sensing element. This, slows down the running programme, and thus leads to inefficiency in the processor. Additionally, storage space is required to store the sub-routine for reading, analysing and comparing the temperature. Furthermore, should a CPU fail to read and analyse the temperature sensed by the temperature sensing element due to a lock-up condition occurring in the CPU or due to the CPU being busy and failing to interrupt at a time when the temperature should be read and analysed, an over temperature or an under temperature condition could go undetected with potentially serious consequences.

Various solutions have been proposed to overcome the problem of the temperature difference between the temperature sensing element and the site at which it is desired to monitor the temperature. For example, one solution which has been implemented in the INTEL XEON (Trade Mark) processor is to store a thermal reference byte in the form of an eight bit word on board the processor. The thermal reference byte is an absolute value of temperature which corresponds to the temperature which would be sensed by the temperature sensing element should the temperature of the thermal plate reach an upper predetermined limit value, which should not be exceeded by the thermal plate. In other words, the absolute value of temperature stored as the thermal reference byte is different to the upper predetermined temperature limit value of the thermal plate by the amount of the temperature difference between the thermal plate and the temperature sensing element. The temperature sensed by the temperature sensing element is thus compared with the thermal reference byte, and on the sensed temperature exceeding that of the thermal reference byte appropriate corrective action is taken.

However, this solution does not overcome the problem of the processing time required to regularly analyse the temperature sensed by the temperature sensing element, nor does it address the problem of a lock-up condition occurring in the CPU, and while it does to some extent compensate for the temperature difference between the temperature sensing element and the thermal plate, it does not entirely overcome this problem either. For example, the thermal reference bytes are written into the processor during manufacture, and take no account of how the processor is subsequently configured. The temperature of the thermal plate, in general, is a function of how the processor is configured in the computer, and thus, depending on the configuration of the computer the temperature difference between the temperature sensing element and the thermal plate can vary relatively significantly from computer to computer. Accordingly, the analysing sub-routine may determine an over temperature condition of the thermal plate when no such over temperature condition exists, and more seriously the analysing sub-routine may fail to determine an over temperature condition of the thermal plate until it is too late.

There is therefore a need for a method and an IC monitoring chip which overcomes these problems.

The present invention is directed towards providing such a method and an IC monitoring chip.

SUMMARY OF INVENTION

According to the invention there is provided an integrated circuit monitoring chip for monitoring the output of a temperature sensing element, the IC chip comprising:

an on-chip first input means for receiving a first input signal from the temperature sensing element corresponding to a temperature value sensed by the temperature sensing element, an on-chip temperature offset storing means for storing a temperature offset value, an on-chip adding means for adding the stored temperature offset value and the temperature value of the first input signal, an on-chip output means for outputting an output signal from the IC chip in response to the output from the adding means, and an on-chip second input means being provided to the temperature offset storing means for facilitating writing the temperature offset value to the temperature offset storing means.

In one embodiment of the invention the temperature offset storing means comprises a temperature offset register in the chip for storing the temperature offset value in digital form.

Preferably, the adding means adds the absolute values of the temperature value of the first input signal and the temperature offset value.

In one embodiment of the invention an on-chip upper and lower limit storing means for storing respective upper and lower predetermined temperature limit values is provided, and an on-chip comparing means for comparing the output from the adding means with the respective upper and lower predetermined temperature limit values is provided. Preferably, the upper and lower limit storing means comprises an upper limit register and a lower limit register provided in the chip for respectively storing the upper and lower predetermined temperature limit values in digital form.

In another embodiment of the invention the comparing means comprises a pair of comparators provided in the chip, one comparator being provided for comparing the output from the adding means with the stored upper predetermined temperature limit value stored in the upper limit register, and the other comparator being provided for comparing the output of the adding means with the lower predetermined temperature limit value stored in the lower limit register. Preferably, the upper and lower predetermined temperature limit values are stored in two's compliment format in the upper and lower limit storing means.

In one embodiment of the invention the output means outputs an alerting signal in the event of the output from the adding means falling outside the upper and lower predetermined temperature limit values.

In another embodiment of the invention an on-chip status storing means is provided for storing the status of the output of the comparing means. Preferably, the status storing means comprises two status registers provided in the chip corresponding to the respective comparators for storing the status of the outputs of the respective comparators.

In a further embodiment of the invention the second input means is adapted for facilitating writing the upper and lower predetermined temperature limit values to the upper and lower limit storing means.

In one embodiment of the invention the first input means comprises an on-chip signal conditioning circuit for receiving the first input signal in analog form from the temperature sensing element.

In another embodiment of the invention an on-chip analog to digital converter is provided for receiving the output from the signal conditioning circuit and for outputting a digital signal corresponding to the temperature value of the first input signal to the adding means. Preferably, the digital signal outputted from the analog to digital converter is outputted in two's compliment format.

In one embodiment of the invention the signal conditioning circuit is adapted for receiving the first input signal from a remotely located temperature sensing element.

In a further embodiment of the invention an on-chip temperature sensing element is located in the chip, and the on-chip signal conditioning circuit is adapted for receiving a second input signal from the on-chip temperature sensing element corresponding to a temperature value sensed by the on-chip temperature sensing element.

In a still further embodiment of the invention two on-chip signal conditioning circuits are provided in the chip for receiving respectively the first input signal and a second input signal from an on-chip temperature sensing element in the chip, the second input signal corresponding to a temperature value sensed by the on-chip temperature sensing element, and an on-chip means is provided in the chip for alternately relaying the temperature values corresponding to the first and second input signals to the adding means. Preferably, the temperature offset storing means stores two temperature offset values corresponding to the respective remotely located and on-chip temperature sensing elements for adding to the temperature values of the respective first and second input signals from the corresponding remotely located and on-chip temperature sensing elements in the adding means. Advantageously, each temperature offset storing means comprises an on-chip temperature offset register. Ideally, the upper and lower limit storing means stores two respective upper and lower predetermined temperature limit values corresponding to the respective remotely located and on-chip temperature sensing elements for comparison with the respective outputs from the adding means which correspond to the first and second input signals.

In one embodiment of the invention the upper and lower limit storing means comprises two upper and two lower limit registers for storing the respective upper and lower predetermined temperature limit values corresponding to the respective temperature sensing elements.

Additionally, the invention provides a computer comprising the IC monitoring chip according to the invention, the computer comprising a storing means for storing the temperature offset value and a writing means for writing the temperature offset value stored in the computer storing means to the temperature offset storing means of the IC chip.

In one embodiment of the invention the computer storing means further stores the upper and lower predetermined temperature limit values and the writing means is adapted for writing the respective upper and lower predetermined temperature limit values to the upper and lower limit storing means of the IC chip.

In another embodiment of the invention the computer storing means is provided by a read only memory, which is adapted for receiving the temperature offset value during manufacture of the computer.

In a further embodiment of the invention the writing means comprises a computer programme.

In a still further embodiment of the invention the writing means is adapted to write the temperature offset value from the computer storing means into the temperature offset storing means of the IC chip on power up of the computer.

Typically, the temperature sensing element is located in the computer remotely of the IC chip.

Further the invention provides a method for monitoring the temperature of a component in a computer wherein a temperature difference exists between the component and a temperature sensing element for measuring the temperature of the component, the method comprising using an IC monitoring chip for monitoring an output temperature value from the temperature sensing element, storing a temperature offset value corresponding to the temperature difference in an on-chip temperature offset storing means located in the IC chip, and adding the output temperature value and the temperature offset value for determining the temperature of the component.

In one embodiment of the invention the temperature offset storing means is provided by a temperature offset register, and the temperature offset value is written to the temperature offset register by a writing means in the computer.

In another embodiment of the invention the method further comprises storing the temperature offset value in a storing means in the computer.

In a still further embodiment the temperature offset value is written to the computer storing means during manufacture of the computer.

Preferably, the temperature offset value is written from the computer storing means to the temperature offset register in the IC chip by the writing means on power up of the computer.

The invention has many advantages. In particular, the IC monitoring chip according to the invention is particularly efficient and relatively accurately monitors temperature of a component in a computer and/or on another integrated circuit chip. By virtue of the fact that the temperature offset storing means, the adding means, the comparing means, the upper and lower limit storing means as well as the input and output means are all provided as on-chip hardware devices, the IC chip according to the invention provides a hardware solution to the problems associated with prior art devices and methods for monitoring temperature. By virtue of the fact that the IC chip according to the invention provides a complete hardware solution which is independent of the CPU of the computer, the IC chip according to the invention after power up can operate completely independently of the CPU. Accordingly, monitoring of the temperature is carried out completely independently of the CPU, and thus, temperature monitoring by the IC chip according to the invention can be carried out regularly at predetermined intervals without the need for interrupts of the running programme in the CPU. Indeed, the output or outputs as the case may be from the IC chip according to the invention may be outputted directly to a fan or other device for regulating the monitored temperature which may be activated directly by an alerting signal from the IC device without the need for any processing power from the CPU. Thus, an over temperature or under temperature condition can be detected, offset-corrected and acted upon independently of the CPU. Although, needlessly to say if desired the CPU may pole the output or outputs, as the case may be from the IC chip according to the invention, and if desired appropriate corrective action may be taken under the control of the CPU to correct the temperature should it fall outside the upper and lower predetermined limits. Additionally, since temperature monitoring is carried out by the monitoring chip independently of the CPU, temperature monitoring is unaffected by the CPU going into a lock-up condition.

Additionally, by virtue of the fact that the offset temperature value is stored in an on-chip temperature offset storing means, and by virtue of the fact that a second input means is provided for writing the temperature offset value into the temperature offset storing means, a temperature offset value specific to an individual computer or similar type of computers can readily easily be stored in a suitable storing means in the computer or computers, typically, ROM, and this temperature offset value is then written into the temperature offset storing means of the IC chip according to the invention each time the computer is powered up. Accordingly, by determining accurately the temperature difference between the temperature sensing element and the component, the temperature of which is to be determined that temperature difference value can readily easily be written into ROM in the computer as the temperature offset value on manufacture of the computer. Where a plurality of computers of the same type and configuration are being produced, once the temperature offset value has been determined for one, or an average temperature offset value has been determined for a sample number of the plurality of computers, then the determined temperature offset value can be written into ROM of each of the plurality of computers of the same type and configuration during manufacture and/or calibration of the computers. Additionally, in the event that a computer is re-configured subsequent to manufacture, it is also possible to redetermine the temperature difference between the temperature sensing element and the component, the temperature of which is to be monitored, and a temperature offset value similar to the determined temperature difference can then be written into the re-configured computer.

Similar advantages are achievable when the IC chip according to the invention is used for monitoring ambient temperature within a computer, whether the ambient temperature is being monitored by the remote temperature sensing means or the on-chip temperature sensing means.

Additionally, or alternatively in the case of high end computers, in other words, relatively expensive computers, the temperature difference between the remote temperature sensing element and the component, the temperature of which is to be monitored may be determined for each high end computer, and this temperature difference value would then be inputted into ROM in the computer as the temperature offset value.

Additionally, there is no requirement for storing a sub-routine for monitoring and analysing temperature sensed by a temperature sensing element in the CPU, thus further freeing up the storage space.

Additionally, should it be desired to change the temperature offset value at any time during the life of a computer, for example, should the computer be re-re-configured, all that is necessary is to enter the new temperature offset value into the ROM in the computer. There is no need for programming the computer or the CPU, nor is there any need for additional software sub-routines.

Additionally, in cases where the upper and lower predetermined temperature limit values are also stored in on-chip upper and lower limit storing means, the respective upper and lower predetermined temperature values may if desired be stored in suitable storing means in the computer and written to the relevant upper and lower limit registers each time the computer is powered up. Accordingly, the respective upper and lower predetermined temperature limits can be written into the computer storing means during manufacture and/or calibration, and can subsequently be changed if desired without any difficulty and without the need for additional software.

A further advantage of the invention which is achieved by some embodiments of the invention is that as well as outputting an alert signal in the event of the sensed temperature falling outside the upper and lower predetermined temperature limit values, the actual temperature of the component or ambient air which is to be monitored can be read directly from the result register, and if desired displayed.

The invention will be more clearly understood from the following description of some preferred embodiments thereof which are given by way of example only with reference to the accompanying drawings.

DETAILED DESCRIPTION OF PREFERRED EMBODIMENTS

Figure 1:
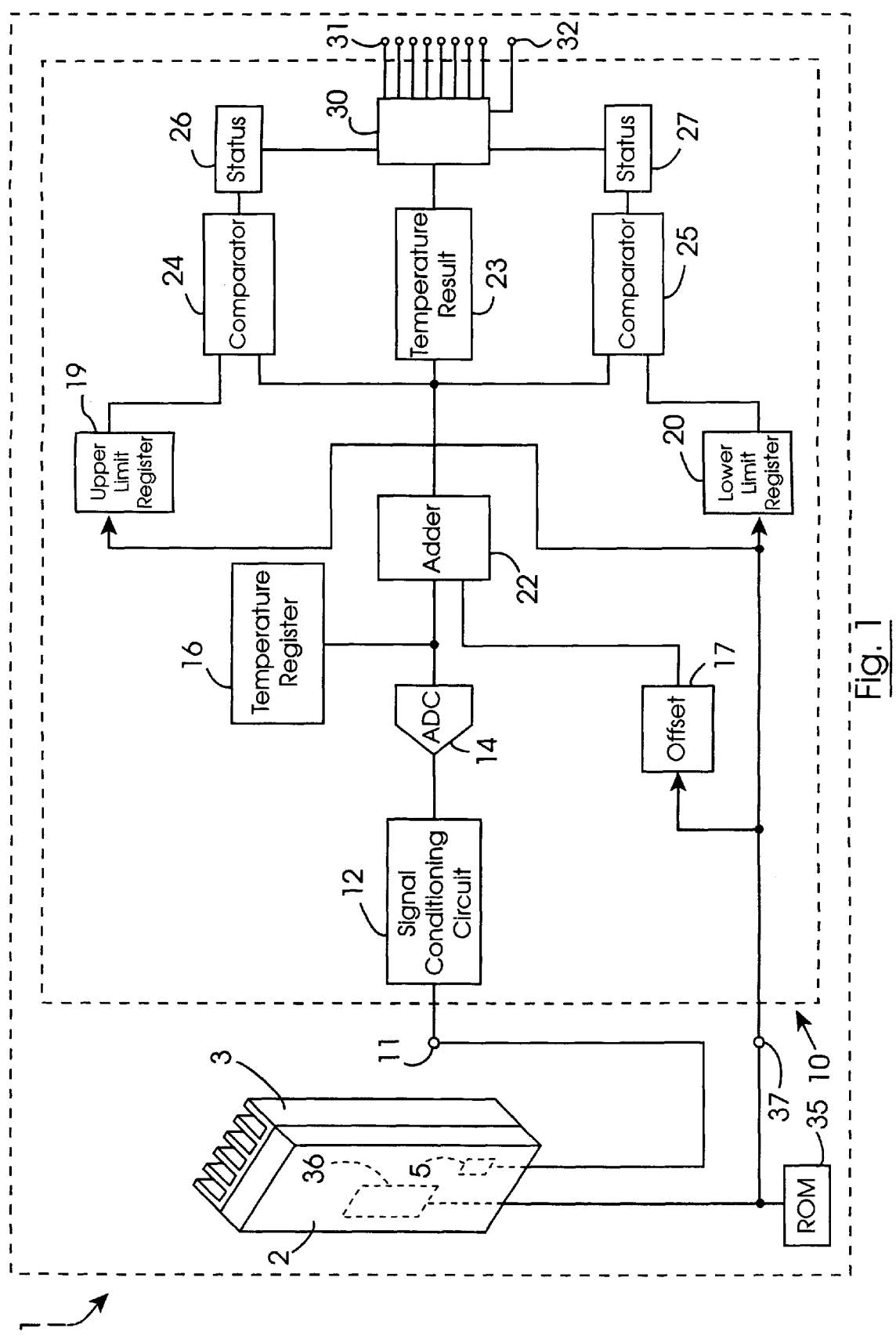
FIG. 1 is a block representation of a computer according to the invention which comprises an IC chip also according to the invention for monitoring the temperature sensed by a temperature sensing element remotely located in the computer.

Referring to the drawings and initially to FIG. 1 there is illustrated a computer according to the invention which is indicated generally by the reference numeral 1, and which comprises a central processing unit (CPU) chip 2, the temperature of the heat sink thermal plate 3 of which is to be monitored. A temperature sensing element, namely, a thermal diode 5 is formed in the substrate of the CPU 2 for monitoring the temperature of the CPU 2, and in turn the heat sink plate 3. An IC chip 10 also according to the invention is located within the computer 1 but remote from the CPU 2 for monitoring the output of the thermal diode 5 independently of the CPU 2. On the IC chip 10 determining that the output of the thermal diode 5 indicates that the temperature of the thermal plate 3 has fallen outside upper or lower predetermined temperature limit values the IC chip 10 provides an output, namely, an alert signal, which can be used to initiate corrective action independently of the CPU 2 to return the temperature of the thermal plate 3 to be within the upper and lower predetermined temperature limit values. Alternatively, or additionally, the output from the IC chip 10 may be poled or read by the CPU 2 which itself would take the appropriate corrective action and/or display the temperature of the thermal plate 3.

The IC chip 10 comprises a first input means, namely, an on-chip signal conditioning circuit 12 having a first input pin 11, and which reads and conditions a first input signal, namely, an analog signal from the thermal diode 5 which is received on the first input pin 11. Such signal conditioning circuits 12 will be well known to those skilled in the art, and provide an analog output which is proportional to the absolute value of the temperature sensed by the thermal diode 5. The analog output from the signal conditioning circuit 12 is fed to an on-chip analog-to-digital converter 14 where the analog signal is converted into a digital signal as an eight bit word in two's compliment format as will be described below. A current temperature value storing means, namely, an on-chip current temperature register 16 stores the current output from the analog-to-digital converter 14.

A temperature offset storing means comprising an on-chip temperature offset register 17 located in the IC chip 10 stores a temperature offset value which corresponds to the temperature difference between the temperature sensed by the thermal diode 5 and the actual temperature of the thermal plate 3. The temperature offset value is stored as an eight bit word in two's compliment format as illustrated in Table 3. By storing the temperature offset value in two's compliment format the IC chip 10 is capable of monitoring temperatures within the range −128° C. and +127° C. in 1° C. increments. The temperature offset value is written into the temperature offset register 17 each time on power up of the computer as will be described in detail below.

TABLE 3

TEMPERATURE DATA FORMAT

| Temperature | Digital Output |
|---|---|
| −128°C. | 1000 0000 |
| −125°C. | 1000 0011 |
| −100°C. | 1001 1100 |
| −75°C. | 1011 0101 |
| −50°C. | 1100 1110 |
| −25°C. | 1110 0111 |
| 0°C. | 0000 0000 |
| +10°C. | 0000 1010 |
| +25°C. | 0001 1001 |
| +50°C. | 0011 0010 |
| +75°C. | 0100 1011 |
| +100°C. | 0110 0100 |
| +125°C. | 0111 1101 |
| +127°C. | 0111 1111 |

Upper and lower limit storing means, namely, an on-chip upper limit register 19 and an on-chip lower limit register 20 provided in the IC chip 10 store an upper predetermined temperature limit value and a lower predetermined temperature limit value, respectively, within which the temperature of the thermal plate 3 of the CPU 2 is to be maintained. The upper and lower predetermined temperature limit values are also stored as eight bit words in two's compliment format. Typically, the upper predetermined temperature limit value would not exceed +85° C., while the lower predetermined temperature limit value would not be below 0° C. The upper and lower predetermined temperature limit values are also written to the respective upper and lower limit registers 19 and 20 during power up of the computer as will be described below.

An adding means, namely, an on-chip adder 22 formed in the IC chip 10 adds the current temperature stored in the current temperature register 16 and the temperature offset value stored in the temperature offset register 17 for providing the actual temperature of the thermal plate 3. The output from the adder 22, namely, the current actual temperature of the thermal plate 3 is stored in an on-chip output register 23 in the IC chip 10. The current actual temperature stored in the output register 23 is the actual temperature of the thermal plate 3 based on the last read analog signal from the thermal diode 5.

A comparing means, namely, a pair of on-chip comparators 24 and 25 formed in the IC chip 10 compares the current temperature stored in the output register 23 with the respective upper and lower predetermined temperature limit values in the upper and lower limit registers 19 and 20, respectively. An on-chip status storing means provided by two on-chips one bit status registers 26 and 27 store the current status of the output from the comparators 24 and 25, respectively. The bit in each status register 26 and 27 is zero when the output from the comparators 24 and 25 indicate that the current temperature of the thermal plate 3 is within the upper and lower predetermined temperature limit values, and the bit is put to one in the relevant status register 26 or 27 when either one of the comparators 24 and 25 indicate that the current temperature of the thermal plate 3 falls outside one of the respective upper and lower predetermined temperature limit values. An output means, namely, an on-chip interface circuit 30 of the type which will be well known to those skilled in the art receives outputs from the status registers 26 and 27 and the output register 23 and interfaces the status register 26 and 27 and the output register 23 with output pins 31 for connection to a bus of the computer. A pin 32 from the interface circuit 30 provides an alerting means, namely, an interrupt signal in the event of the bit in either one of the status registers 26 or 27 going to one. The interrupt pin 32 may be connected directly to control circuitry (not shown) for controlling any suitable regulating means for regulating the temperature of the thermal plate 3 independently of the CPU 2. Such control circuitry may be provided, for example, for switching on or switching off an air circulating fan (not shown) in the computer in the event of the temperature of the thermal plate 3 falling outside the upper and lower predetermined temperature limit values. Alternatively, the outputs of the status registers 26 and 27 may be read on the bus 31 directly by the CPU 2 which itself may control the temperature regulating means within the computer. Additionally, the CPU 2 may read the current actual temperature of the thermal plate 3 from the output register 23 through the bus 31 which may be displayed by the CPU 2 if desired. In the event that the output 31 of the IC chip 10 is read by the CPU 2 for controlling the temperature of the heat sink plate 3, should the temperature of the heat sink plate 3 exceed the upper predetermined temperature limit value, as well as or instead of switching on or speeding up an air circulating fan (not shown) within the computer 1, the CPU 2 could in certain extreme cases slow down its processing speed.

The temperature offset value is written into a ROM 35 in the computer 1 as an eight bit word in two's compliment format on manufacture or calibration of the computer 1 and is stored therein. Software 36 is provided in the BIOS system of the computer 1 for writing the temperature offset value from the ROM 35 to the temperature offset register 17 each time the computer 1 is powered up through a second input means, namely, a second input pin 37. The upper and lower predetermined temperature limit values may be stored in EEROM or may be set by dip switches in the computer during manufacture or calibration of the computer 1 and each time on power up of the computer 1 as well as the software 36 writing the temperature offset value from the ROM 35 to the temperature offset register 17 the software 36 would also write the upper and lower predetermined temperature limit values into the upper and lower limit registers 19 and 20, respectively, through the second input pin 37. Such software as the software 36 will be well known to those skilled in the art, and it is typical of other software which is contained in the BIOS system of a computer.

In use, the on-chip signal conditioning circuit 12 on the IC chip 10 reads and conditions the output analog signal from the thermal diode 5 and feeds an analog signal corresponding to the temperature value sensed by the thermal diode 5 to the analog-to-digital converter 14. A corresponding eight bit digital signal in two's compliment format is relayed from the analog-to-digital converter 14 to the current temperature register 16 and to the adder 22 where it is added to the temperature offset value from the temperature offset register 17, and in turn compared by the comparators 24 and 25 with the respective upper and lower predetermined temperature limit values in the upper and lower limit registers 19 and 20, respectively. In the event that the current temperature is within the upper and lower predetermined temperature limit values, the comparators 24 and 25 output a zero to the respective status registers 26 and 27. In the event of the current temperature exceeding the upper predetermined temperature limit value or dropping below the lower predetermined temperature limit value, the output of the corresponding comparator 24 or 25 goes high, thus putting a one in the corresponding status register 26 or 27. This in turn puts an interrupt signal on the interrupt pin 32 for relaying to the control circuitry (not shown) in the computer 1 for taking corrective action for returning the temperature of the heat sink plate 3 to be within the upper and lower predetermined temperature limit values.

The current temperature of the thermal plate 3 is stored in the output register 23 and may be read at any time by the CPU 2 for display or otherwise.

The IC chip 10 is particularly suitable for mass production of computers. It is envisaged that an average value of the temperature difference between the temperature sensed by the thermal diode 5 and the corresponding actual temperature of the thermal plate 3 for each range of computers of a particular type and configuration will be initially determined. This average value of temperature difference will be written into the ROM 35 of each computer of the same type and configuration during manufacture or calibration as the temperature offset value. Alternatively, in high end computers it is envisaged that during manufacturing or calibration of each computer the temperature difference between the temperature sensed by the thermal diode 5 and the corresponding actual temperature of the thermal plate 3 will be determined for each such computer, and that temperature difference will be written into the ROM 35 of that computer as the temperature offset value.

By virtue of the fact that temperature offset value and the upper and lower predetermined temperature limit values are stored in two's compliment format and the digital output from the analog-to-digital converter is also in two's compliment format when the various values are added the absolute values of the values are taken into account, in other words, negative and positive values are taken into account.

Figure 2:
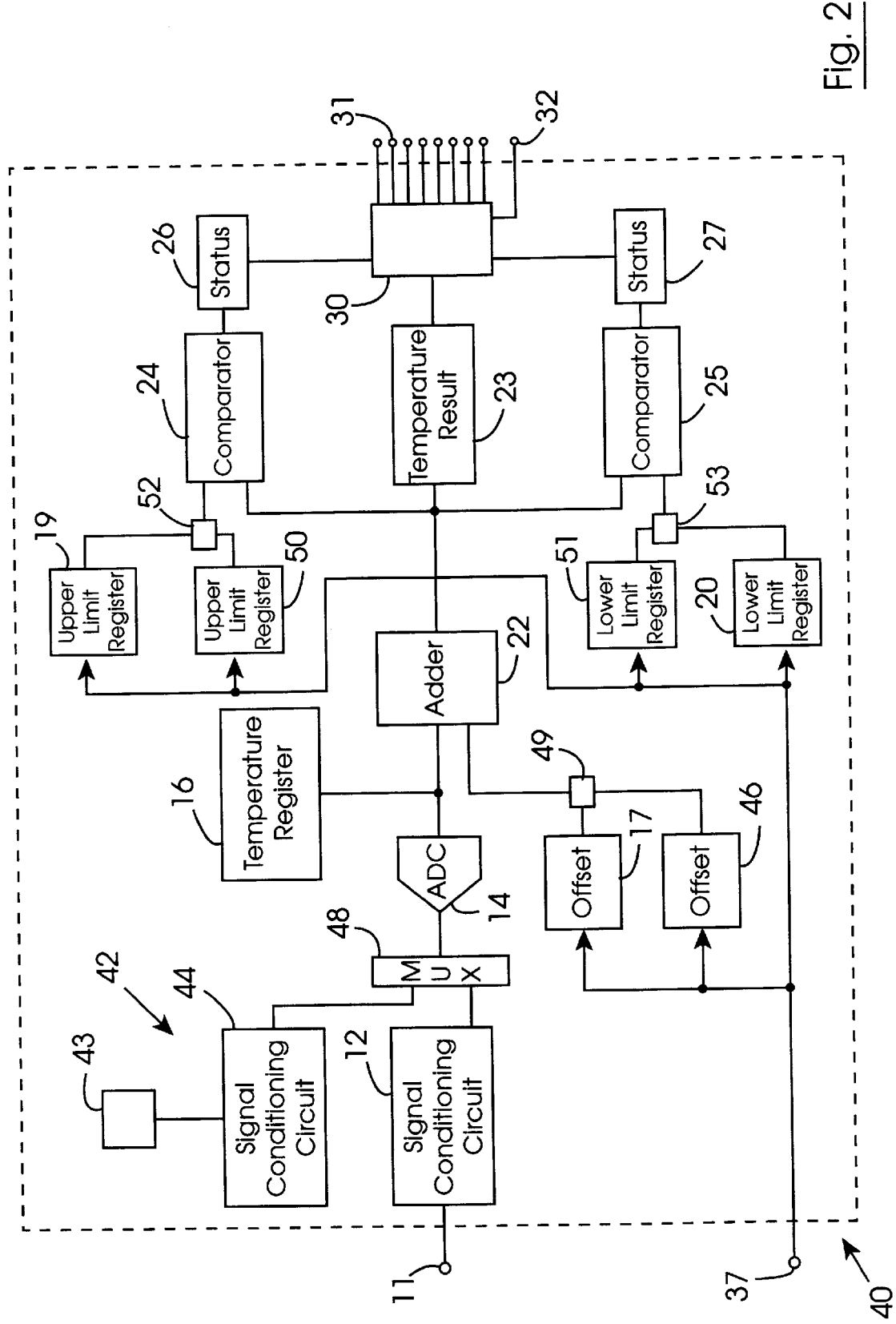
FIG. 2 is a block representation of an IC chip according to another embodiment of the invention also for monitoring temperature in a computer.

Referring now to FIG. 2 there is illustrated an IC monitoring chip according to another embodiment of the invention which is indicated generally by the reference numeral 40 also for remotely monitoring the temperature of a thermal plate (not shown) but similar to the thermal plate 3 of a CPU (also not shown) of a computer (not shown). The IC chip 40 is substantially similar to the IC chip 10 and similar components are identified by the same reference numerals. The main difference between the IC chip 40 and the IC chip 10 is that as well as remotely monitoring a thermal diode (not shown) of the CPU the IC chip 40 also comprises an on-chip bandgap temperature sensor 42. The temperature sensor 42 comprises a temperature sensing element which is provided by a thermal diode 43 formed in the substrate of the IC chip 40, and a second signal conditioning circuit 44 similar to the circuit 12 for conditioning the analog output signal from the thermal diode 43. In this embodiment of the invention the on-chip temperature sensor 42 is particularly suitable for monitoring ambient temperature within the computer.

However, since there will be a temperature difference between the ambient temperature and the temperature sensed by the diode 43, a second on-chip temperature offset register 46 is provided for storing a second temperature offset value which corresponds to the temperature difference between the temperature sensed by the thermal diode 43 and the ambient temperature. In this embodiment of the invention the second temperature offset value is also stored in two's compliment format as an eight bit word. The analog output from the thermal diode (not shown) of the CPU (also not shown) of the computer is applied to the pin 11 which in turn is fed to a first signal conditioning circuit 12 and which is identical to the signal conditioning circuit 12 of the IC chip 10. A first temperature offset register 17 which is also identical to the temperature offset register 17 of the IC circuit 10 is provided for storing the offset temperature between the remote thermal diode (not shown) of the CPU and the thermal plate of the CPU. Analog output signals from the first signal conditioning circuit 12 and the signal conditioning circuit 44 are fed through an on-chip multiplexer 48 to the analog-to-digital converter 14. A switch 49 in the substrate of the IC chip 40 switches the adder 22 between the respective temperature offset registers 17 and 46 depending on which temperature value is being outputted by the analog-to-digital converter 14.

In case the desired upper and lower predetermined temperature limit values for the ambient temperature are different to those for the thermal plate, second upper and lower limit registers 50 and 51, respectively, are provided for storing upper and lower predetermined ambient temperature limit values. The upper and lower predetermined ambient temperature limit values are stored in two's compliment format as eight bit words. Switches 52 and 53 formed in the substrate of the IC chip 40 switch the comparators 24 and 25 between the respective upper limit registers 19 and 50, and the respective lower limit registers 20 and 51, respectively, depending on which temperature value is being outputted by the analog-to-digital converter 14. In this embodiment of the invention the respective temperature offset values are stored in ROM (not shown) in the computer and are written to the corresponding temperature offset registers 17 and 46, respectively, on power up of the computer by software similar to the software 36. The upper and lower predetermined temperature limit values of the thermal plate of the CPU are also stored in the computer as already described with reference to the computer 1, and written to the limit registers 19 and 20 on power up of the computer. Should the upper and lower predetermined temperature limit values for ambient temperature be different to those for the thermal plate 3 the respective upper and lower predetermined ambient temperature limit values are stored in the computer and written to the upper and lower limit registers 50 and 51, respectively, on power up of the computer by the software in the BIOS.

Operation of the IC chip 40 is similar to that of the integrated circuit chip 10 with the exception that the signals from the signal conditioning circuits 12 and 44 are alternately and sequentially mulitplexed to the analog-to-digital converter 14 and are then added in the adder 22 to the corresponding temperature offset value in the temperature offset registers 17 and 46 as the case may be, which are alternately switched to the adder 22 by the switch 49. The outputs from the adder 22 are compared by the comparators 24 and 25 with the corresponding upper and lower predetermined temperature limit values in the corresponding upper and lower limit registers 19 and 20, and 50 and 51 respectively, which are alternately switched to the corresponding comparators 24 and 25 by the switches 52 and 53. The current temperature being outputted by the adder 22 is stored in the output register 23. If desired the current output temperatures may be latched into separate output registers, one for storing the current temperature of the thermal plate, and the other for storing the current ambient temperature.

Although only input pins for inputting the signals from the remote temperature sensing element to the signal conditioning circuit and for permitting writing of the temperature offset values and the upper and lower predetermined limit values to the respective registers in the IC chips 10 and 40 have been illustrated, and only output pins for facilitating interfacing the output of the IC chips 10 and 40 with the CPU or for outputting an interrupt signal for controlling temperature regulating means in the computer have been illustrated, it will be appreciated that many other input and output pins as required will be provided to the IC chips 10 and 40 for facilitating reading and writing to and from and the IC chips 10 and 40. Additionally, if desired appropriate pins for facilitating communication between the IC chips 10 and 40 and the CPU through appropriate serial or parallel system buses may also be provided. The provision of such input and output pins will be well known to those skilled in the art.

While the IC chips 10 and 40 have been described for remotely monitoring the temperature of the thermal plate of a CPU, it will be appreciated that the IC chips 10 and 40 may be provided for remotely monitoring the temperature of any other integrated circuit chip or indeed any other component in a computer or elsewhere, for example, for monitoring the temperature of a hard disc drive, for monitoring ambient temperature in the video area of a computer. In the case of monitoring temperature of a hard disc drive, it is envisaged that a thermal diode would be located under the hard disc drive. In the case of monitoring ambient temperature in the video area of a computer, it is envisaged that either the on-chip temperature sensor 32 may be used if the IC chip 40 were located in the video area, or alternatively, a remotely located temperature sensing element, such as, for example, a thermal diode may be located in the video area. It will also be appreciated that instead of using the on-chip temperature sensor of the IC chip 40 for sensing ambient temperature, the on-chip temperature sensor could be used for monitoring the temperature of any of the components on the IC chip 40 or in the computer.

It is also envisaged that the IC chips 10 and 40, as well as being provided for monitoring temperature, may also be provided for monitoring voltage and other parameters of computers and CPUs or other chips, and for comparing the monitored voltages and other parameters with upper and/or lower predetermined values. In such cases, it is envisaged that additional on-chip signal conditioning circuits, adders, upper and lower limit registers and comparators as well as status registers would be provided for use in monitoring the other parameters of the computer and/or CPU.

It will be appreciated that while the temperature values have been described as being converted and stored in digital form in two's compliment format as eight bit words, the temperature values could be converted and stored in words of any desired or suitable length.

It is further envisaged that instead of providing an upper and a lower limit storage means for storing respective upper and lower temperature limit values, in certain cases only one limit storing means may be provided for storing one temperature limit value, typically, an upper temperature limit value. It is also envisaged that where two limit storing means are provided, each limit storing means may provide an upper temperature limit value. For example, one limit storing means may store an upper temperature limit value which would be less than the upper temperature limit value stored by the other limit storing means, so that when the monitored temperature reached the lower of the two upper temperature limit values one type of corrective action would be taken, and should the monitored temperature reach the upper of the two upper temperature limit values another type of corrective action would be taken. The two types of corrective action could, for example, be the activation of a two speed fan, and in which case, the fan would be operated at its lower speed when the monitored temperature reached the lower of the two temperature limit values, and would be operated at its higher speed when the monitored temperature reached the upper of the two temperature limit values.

What is claimed is:

1. An integrated circuit monitoring chip for monitoring the output of a temperature sensing element, the IC chip comprising:

an on-chip first input means for receiving a first input signal from the temperature sensing element corresponding to a temperature value sensed by the temperature sensing element, an on-chip temperature offset storing means for storing a temperature offset value, an on-chip adding means for adding the stored temperature offset value and the temperature value of the first input signal, an on-chip output means for outputting an output signal from the IC chip in response to the output from the adding means, and an on-chip second input means being provided to the temperature offset storing means for facilitating writing the temperature offset value to the temperature offset storing means.

2. An IC chip as claimed in claim 1 in which the temperature offset storing means comprises a temperature offset register in the chip for storing the temperature offset value in digital form.

3. A IC chip as claimed in claim 1 in which the adding means adds the absolute values of the temperature value of the first input signal and the temperature offset value.

4. An IC chip as claimed in claim 1 in which the temperature offset value is stored in two's compliment format in the offset temperature storing means.

5. An IC chip as claimed in claim 1 in which an on-chip upper and lower limit storing means for storing respective upper and lower predetermined temperature limit values is provided, and an on-chip comparing means for comparing the output from the adding means with the respective upper and lower predetermined temperature limit values is provided.

6. An IC chip as claimed in claim 5 in which the upper and lower limit storing means comprises an upper limit register and a lower limit register provided in the chip for respectively storing the upper and lower predetermined temperature limit values in digital form.

7. An IC chip as claimed in claim 6 in which the comparing means comprises a pair of comparators provided in the chip, one comparator being provided for comparing the output from the adding means with the stored upper predetermined temperature limit value stored in the upper limit register, and the other comparator being provided for comparing the output of the adding means with the lower predetermined temperature limit value stored in the lower limit register.

8. An IC chip as claimed in claim 5 in which the upper and lower predetermined temperature limit values are stored in two's compliment format in the upper and lower limit storing means.

9. An IC chip as claimed in claim 5 in which the output means outputs an alerting signal in the event of the output from the adding means falling outside the upper and lower predetermined temperature limit values.

10. An IC chip as claimed in claim 5 in which an on-chip status storing means is provided for storing the status of the output of the comparing means.

11. An IC chip as claimed in claim 10 in which the status storing means comprises two status registers provided in the chip corresponding to the respective comparators for storing the status of the outputs of the respective comparators.

12. An IC chip as claimed in claim 5 in which the second input means is adapted for facilitating writing the upper and lower predetermined temperature limit values to the upper and lower limit storing means.

13. An IC chip as claimed in claim 1 in which the first input means comprises an on-chip signal conditioning circuit for receiving the first input signal in analog form from the temperature sensing element.

14. An IC chip as claimed in claim 13 in which an on-chip analog to digital converter is provided for receiving the output from the signal conditioning circuit and for outputting a digital signal corresponding to the temperature value of the first input signal to the adding means.

15. An IC chip as claimed in claim 14 in which the digital signal outputted from the analog to digital converter is outputted in two's compliment format.

16. An IC chip as claimed in claim 13 in which the signal conditioning circuit is adapted for receiving the first input signal from a remotely located temperature sensing element.

17. An IC chip as claimed in claim 13 in which an on-chip temperature sensing element is located in the chip, and the on-chip signal conditioning circuit is adapted for receiving a second input signal from the on-chip temperature sensing element corresponding to a temperature value sensed by the on-chip temperature sensing element.

18. An IC chip as claimed in claim 13 in which two on-chip signal conditioning circuits are provided in the chip for receiving respectively the first input signal and a second input signal from an on-chip temperature sensing element in the chip, the second input signal corresponding to a temperature value sensed by the on-chip temperature sensing element, and an on-chip means is provided in the chip for alternately relaying the temperature values corresponding to the first and second input signals to the adding means.

19. An IC chip as claimed in claim 18 in which the temperature offset storing means stores two temperature offset values corresponding to the respective remotely located and on-chip temperature sensing elements for adding to the temperature values of the respective first and second input signals from the corresponding remotely located and on-chip temperature sensing elements in the adding means.

20. An IC chip as claimed in claim 19 in which each temperature offset storing means comprises an on-chip temperature offset register.

21. An IC chip as claimed in claim 18 in which the upper and lower limit storing means stores two respective upper and lower predetermined temperature limit values corresponding to the respective remotely located and on-chip temperature sensing elements for comparison with the respective outputs from the adding means which correspond to the first and second input signals.

22. An IC chip as claimed in claim 21 in which the upper and lower limit storing means comprises two upper and two lower limit registers for storing the respective upper and lower predetermined temperature limit values corresponding to the respective temperature sensing elements.

23. A computer comprising the IC monitoring chip as claimed in claim 1 in which the computer comprises a storing means for storing the temperature offset value and a writing means for writing the temperature offset value stored in the computer storing means to the temperature offset storing means of the IC chip.

24. A computer as claimed in claim 23 in which the computer storing means further stores the upper and lower predetermined temperature limit values and the writing means is adapted for writing the respective upper and lower predetermined temperature limit values to the upper and lower limit storing means of the IC chip.

25. A computer as claimed in claim 23 in which the computer storing means is provided by a read only memory, which is adapted for receiving the temperature offset value during manufacture of the computer.

26. A computer as claimed in claim 23 in which the writing means comprises a computer programme.

27. A computer as claimed in claim 23 in which the writing means is adapted to write the temperature offset value from the computer storing means into the temperature offset storing means of the IC chip on power up of the computer.

28. A computer as claimed in claim 23 in which the temperature sensing element is located in the computer remotely of the IC chip.

29. A method for monitoring the temperature of a component in a computer wherein a temperature difference exists between the component and a temperature sensing element for measuring the temperature of the component, the method comprising using an IC monitoring chip for monitoring an output temperature value from the temperature sensing element, storing a temperature offset value corresponding to the temperature difference in an on-chip temperature offset storing means located in the IC chip, and adding the output temperature value and the temperature offset value for determining the temperature of the component.

30. A method as claimed in claim 29 in which the temperature offset storing means is provided by a temperature offset register, and the temperature offset value is written to the temperature offset register by a writing means in the computer.

31. A method as claimed in claim 29 in which the method further comprises storing the temperature offset value in a storing means in the computer.

32. A method as claimed in claim 31 in which the temperature offset value is written to the computer storing means during manufacture of the computer.

33. A method as claimed in claim 31 in which the temperature offset value is written from the computer storing means to the temperature offset register in the IC chip by the writing means on power up of the computer.

* * * * *